Patented May 6, 1941

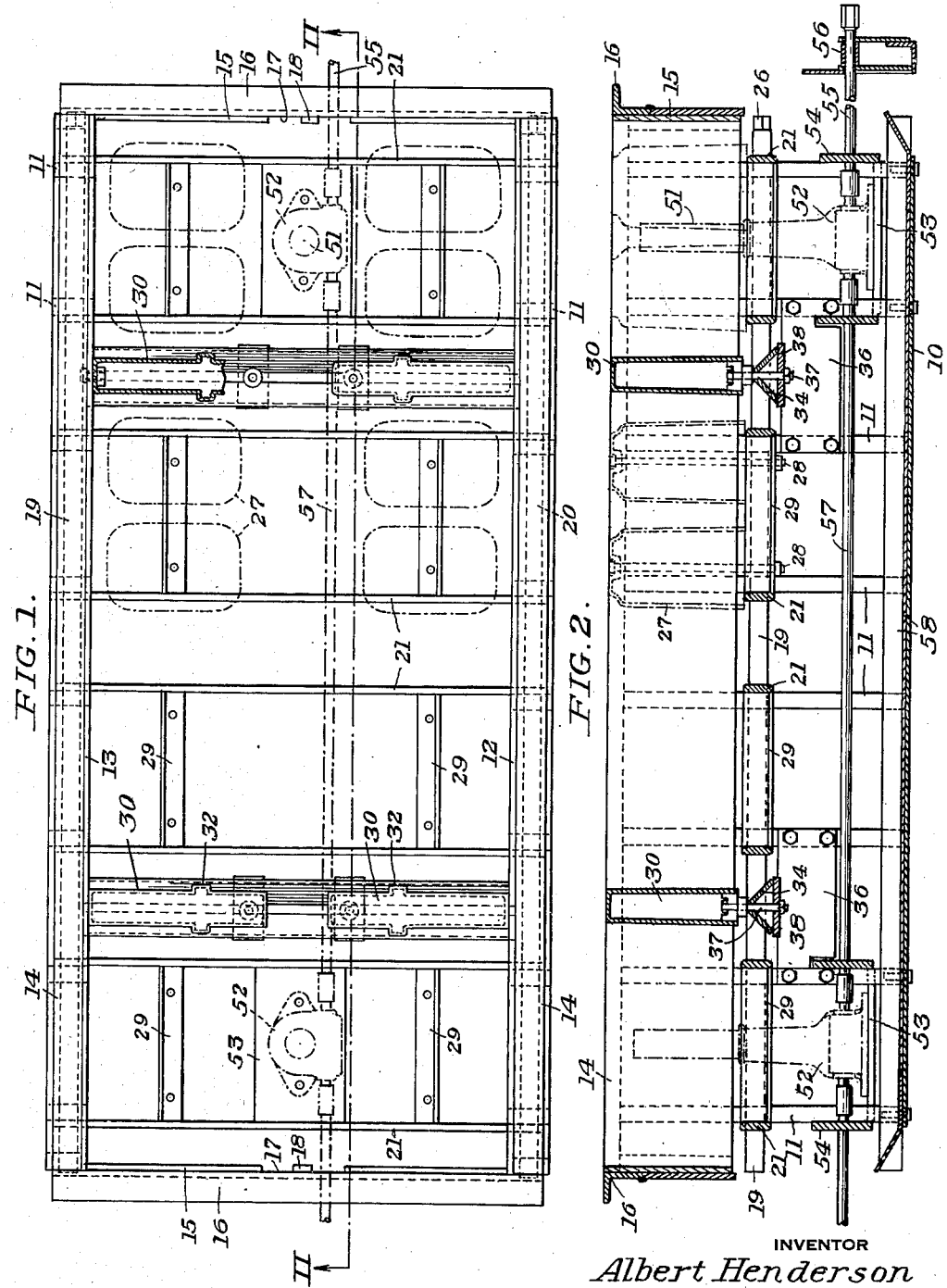

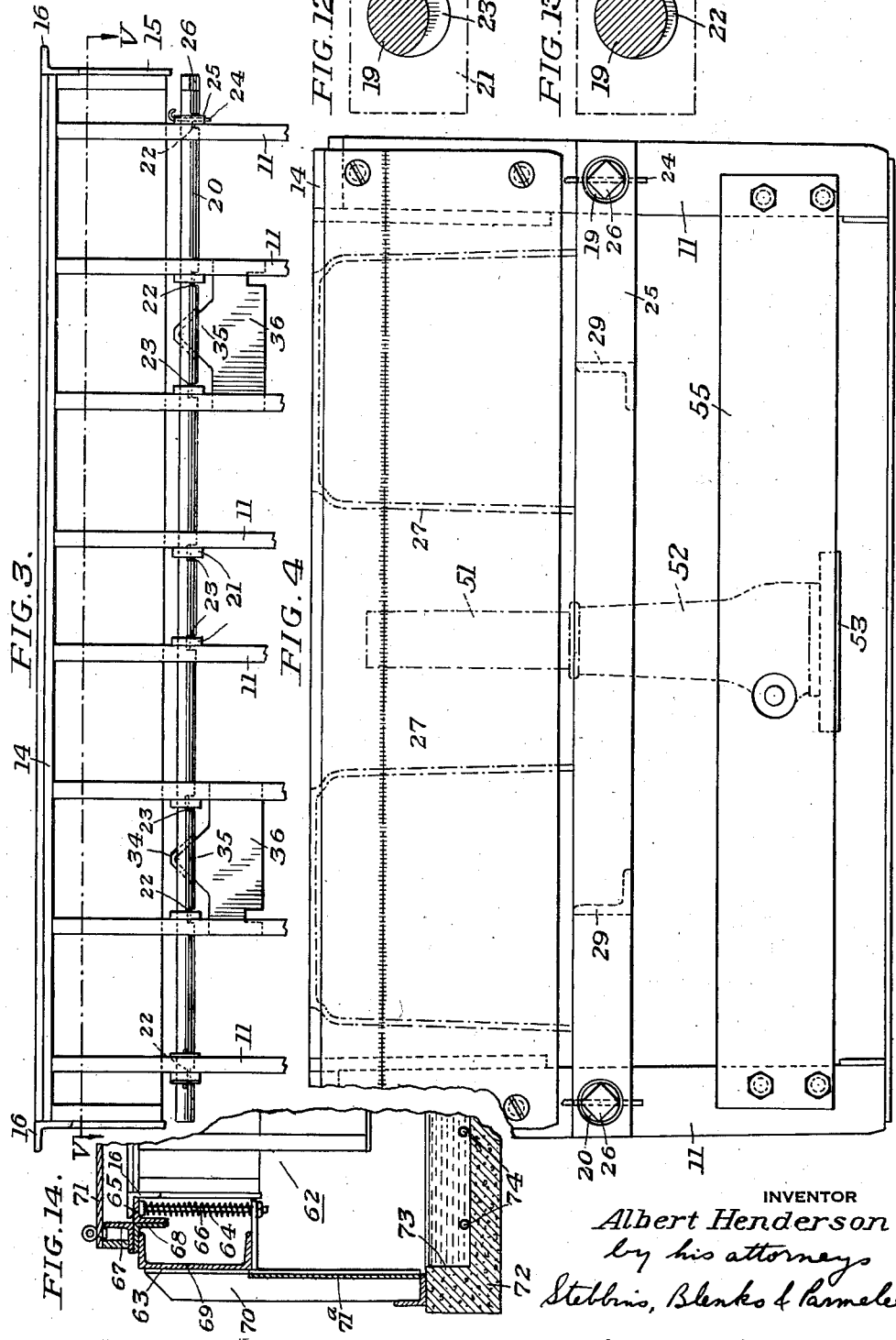

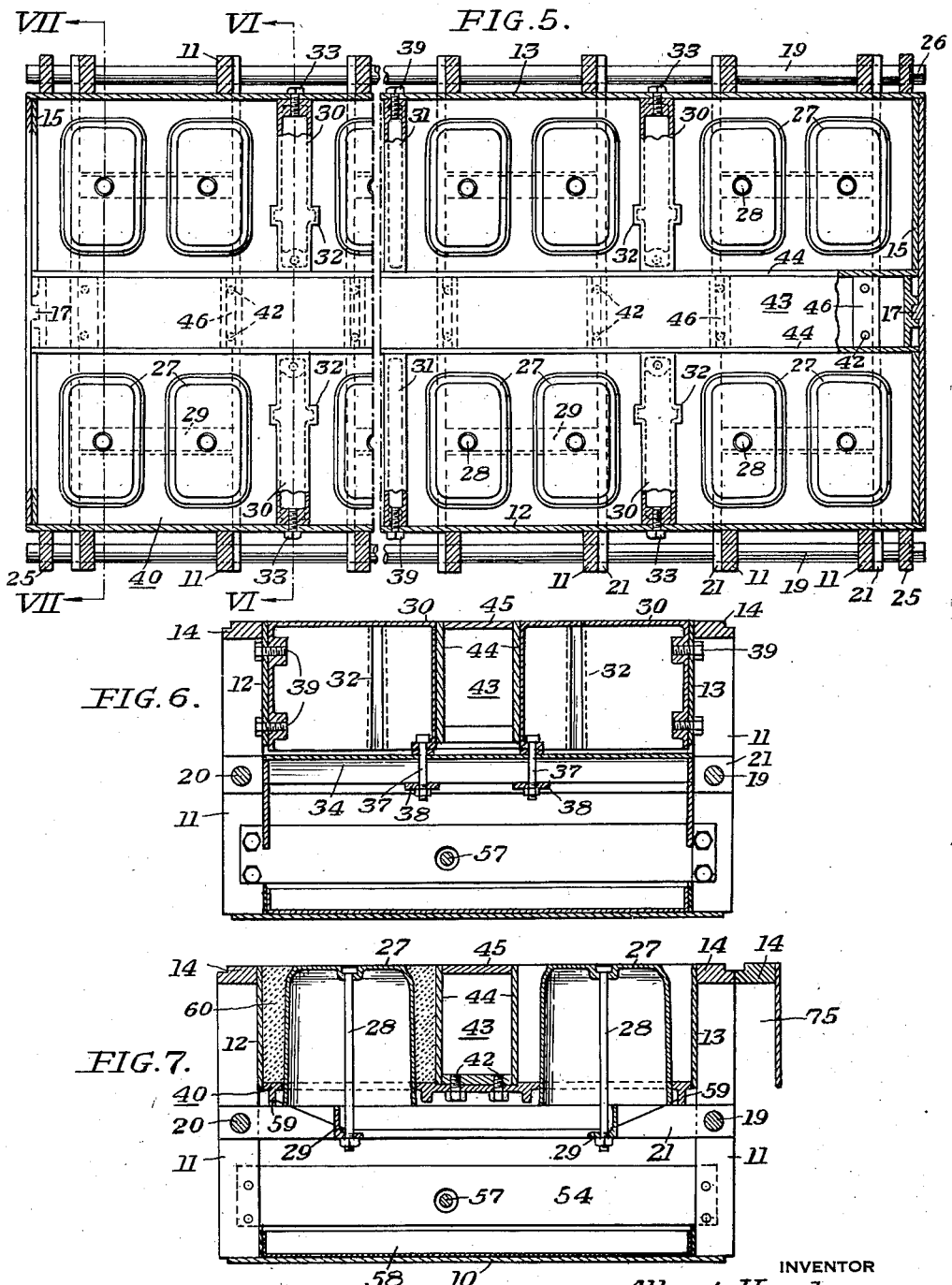

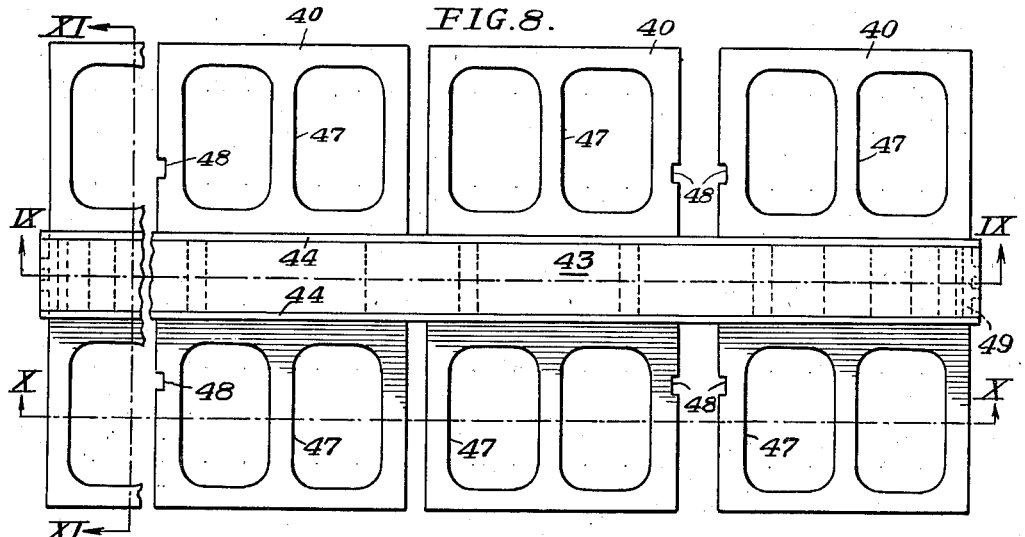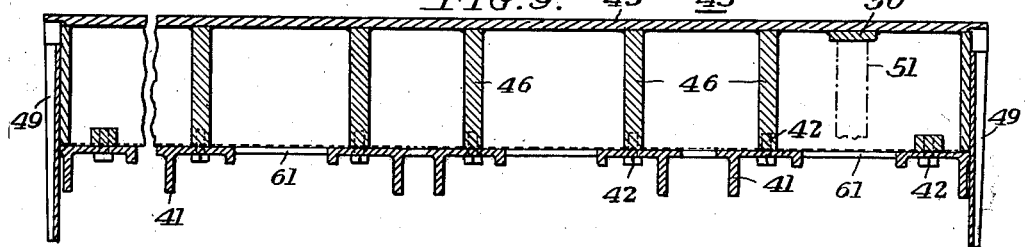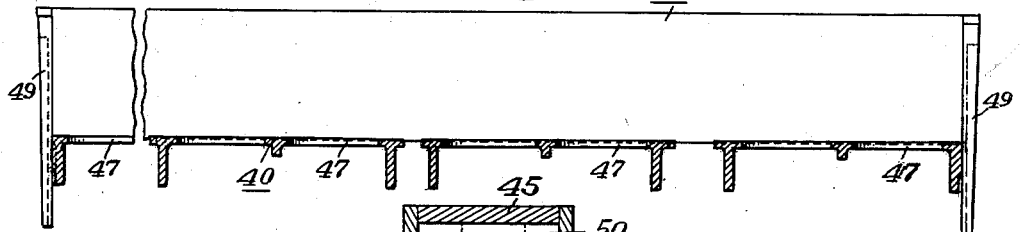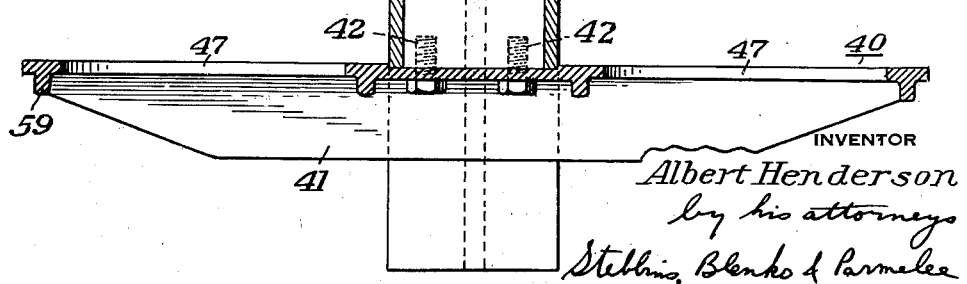

2,240,776

UNITED STATES PATENT OFFICE 2,240,776

APPARATUS FOR MAKING CONCRETE BLOCKS

Albert Henderson, Edgewood, Pa., assignor to William P. Witherow, Pittsburgh, Pa.

Application September 16, 1938, Serial No. 230,186

13 Claims. (Cl. 25—121)

This invention relates to apparatus for making molded concrete articles such as blocks.

It is an object of this invention to provide an apparatus for making molded concrete articles such as blocks more expeditiously and at a lower cost than has been possible with the apparatus available heretofore. In general, the invention comprises a shell supported in a suitable framework and a pallet support removably disposed within the shell. The pallet support defines one side wall of a plurality of mold compartments and has pallets forming the bottoms thereof. The shell and intermediate transverse partitions mounted therein define the remaining three side walls of each mold compartment. I provide means for lifting the pallet support to break progressively the bond between the blocks and void-forming cores extending upwardly through suitable openings in the pallets carried on the pallet support. I also provide means for progressively applying downward force to the cores when necessary to detach them from the molded blocks. Other novel features and advantages of the invention will become apparent in the course of the following detailed description referring to the accompanying drawings illustrating a preferred embodiment, and will be particularly pointed out in the appended claims. In the drawings:

Fig. 1 is a plan view of the shell with the pallet support and associated pallets removed therefrom;

Fig. 2 is a sectional view taken along the line II—II of Fig. 1;

Fig. 3 is a partial side elevation to enlarged scale;

Fig. 4 is an end elevation;

Fig. 5 is a partial sectional view taken substantially along the line V—V of Fig. 3, showing the pallet support and associated pallets in position within the shell;

Figs. 6 and 7 are transverse sectional views taken along the lines VI—VI and VII—VII respectively of Fig. 5;

Fig. 8 is a plan view of the pallet support and its associated pallets apart from the shell;

Figs. 9 and 10 are longitudinal sectional views taken along the lines IX—IX and X—X respectively of Fig. 8;

Fig. 11 is a transverse sectional view taken along the line XI—XI of Fig. 8;

Figs. 12 and 13 are partial sections illustrating a detail; and

Fig. 14 is a partial transverse sectional view similar to Fig. 6 illustrating a modification.

Referring now in detail to the drawings and, for the present, to Figs. 1 through 4, the shell comprises a base plate 10 having studs or columns 11 upstanding therefrom in spaced relation along each of the longitudinal edges thereof. Plates 12 and 13 forming the side walls of the shell are secured to the studs 11. Longitudinal bars 14 are secured to the side walls and rest on the upper ends of the studs. Plates 15 forming the end walls of the shell are secured to the end pairs of opposed studs and strengthening angles 16 are secured to the upper edge thereof. The end walls are provided with vertical guide grooves 17 and a rib 18.

Longitudinal shafts 19 and 20 are journaled in the studs at each side of the shell. These shafts pass through the ends of core bars 21 extending across the shell below the side walls thereof. The shafts 19 and 20 are notched as at 22 and 23 where they pass through the core bars 21, the depth of the notches in each pair of bars increasing progressively from the ends of the shell towards the transverse central plane through the shell. The notches in each successive pair of core bars are of the same depth. The purpose of this construction will be explained hereinafter. The shape of the slots and the difference between their depths may be observed in Figs. 12 and 13. The shafts 19 and 20, while rotatable in the studs 11, are ordinarily held against rotation by a removable pin 24 inserted through alined bores in the ends of the shafts and one of a pair of cross bars 25 secured to the studs adjacent the end of the shell. The ends of the shafts are squared as at 26 to receive a wrench, crank or the like.

Cores 27 are supported on the bars 21 by through bolts 28 (Figs. 2 and 7). The bolts 28 pass through cross bars 29 extending between adjacent pairs of core bars and secured thereto. The cores 27 are hollow, as shown, and open at the bottom. They are also tapered slightly to facilitate removal of blocks formed by pouring concrete therearound.

Intermediate partitions 30 extend inwardly from opposite sides of the shell. These partitions, together with central partitions 31 (Fig. 5) divide the shell longitudinally into four spaces each adapted, by the aid of pallets and a pallet support to be described hereinafter, for the formation of a pair of molded blocks. The partitions 30 have groove forming ribs 32 and terminate short of the longitudinal central plane through the shell, leaving space for the pallet support which is insertible therein in a manner which will be explained later. The partitions 30 are hollow and are open at the bottom. Each partition is secured to the side wall of the shell by screws 33. Transversely alined partitions are supported from below by an angle bar 34 disposed with its vertex uppermost on triangular projections 35 extending upwardly from bearing plates 36. These plates extend between the studs adjacent the partitions and are secured to the studs. Bolts 37 extend through inturned flanges at the inner ends of the partitions 30 (see Fig. 6) and through bearing plates 38 engaging the edges of the flanges of the angle bars 34. The partitions are thus rigidly supported throughout their entire length.

The partitions 31 are similar in general to the partitions 30 but are secured to the shell only by screws 39 passing through the side walls 12 and 13 and entering the ends of the partitions. The latter, furthermore, are not so wide as the partitions 30 and have plane surfaces. Like the partitions 30, however, they are hollow and open at the bottom.

Referring now more particularly to Figs. 5 through 11, a plurality of pallets 40 which may conveniently be cast in pairs with strengthening ribs 41, are secured by screws 42 to a pallet support 43. This support or beam comprises side plates 44, a top plate 45 and bracing blocks 46. The pallet support may conveniently be constructed by welding together pieces of flat stock of suitable shape and thickness. The pallets 40 have openings 47 therein to admit the cores 27. The end edges of the pallets are notched as at 48 to cooperate with the groove forming ribs 32 on the partitions 30. Tongue and groove guides 49 are secured to the ends of the pallet support 43 for cooperation with the guide grooves 17 and ribs 18 formed on the end walls 15 of the shell. Bearing plates 50 are secured to the under side of the top plate 45 of the pallet support for cooperation with the extensible members 51 of jacks 52 disposed below the shell and adjacent the ends thereof as best shown in Fig. 2. The jacks are supported on plates 53 carried on cross plates 54 secured to the studs adjacent the ends of the shell. A driving shaft 55 is journaled in a bearing 56, extends through one of the cross plates 54 and connects with the adjacent jack. A longitudinal drive shaft 57 extends between the jacks whereby they are both operated simultaneously.

A pan 58 is removably disposed on the bottom plate 10 below the shell to collect any seepage passing through the joints between the shell or cores and the pallets.

It will be understood from the foregoing description that the pallet support and associated pallets may be lowered into the shell by any suitable means such as an overhead crane. The lowermost position of the pallet support and associated pallets is determined by the engagement of longitudinal ribs 59 formed on the pallet castings with the core bars 21 as shown in Fig. 7.

After the pallets have been disposed within the shell, concrete is poured in the mold compartments defined by the pallets, the side plates of the pallet support, the side and end plates of the shell and the partitions 30 and 31. The concrete flows around the cores 27 forming molded blocks such as shown at 60 having voids extending vertically therethrough. It will be noted that the shell and pallet construction disclosed is designed for the molding of eight blocks in a single operation. Any convenient means may be employed for pouring concrete in the molds to the desired level.

After the concrete has been poured in the mold compartments, heat is supplied beneath the latter to expedite curing of the concrete. Steam may be supplied, for example, from any convenient source and released beneath the mold compartments. The partitions 30 and 31 and the cores 27 being open at the bottom admit the steam to the interior thereof, thus supplying heat to the molded blocks at all points there around. The pallet castings, furthermore, have openings 61 (Fig. 9) which admit steam into the interior of the pallet support 43. This construction permits the curing time to be materially shortened thereby increasing the production obtainable with a single unit such as that disclosed.

When the blocks have been cured sufficiently, the jacks 52 are operated to raise the pallet support and its associated pallets, leaving the shell including the side walls, end walls and partitions 30 and 31 behind, as well as the cores 27. The latter tend initially to move upwardly with the molded blocks and are permitted to do so to a limited extent, i. e., the depth of the slots 23 in the shafts 19 and 20. By reason of the fact that the slots increase in depth for each pair of core bars from the ends of the shell toward the central transverse plane thereof, the cores of the mold compartments nearest the ends of the shell are first arrested, then the cores of the compartments nearer the central transverse plane. By reason of this progressive action, the entire power of the jacks is applied to the detachment of only half the total number of cores from their associated blocks, at a time.

If difficulty should be experienced in detaching the blocks from their cores by raising the pallet support and the pallets, furthermore, the shafts 19 and 20 may be turned by applying a wrench or a crank to the squared ends thereof. This applies a powerful cam action to the core bars progressively in the same manner that the cores are normally held down as the blocks are raised. This cam action will be apparent at once from a consideration of Figs. 12 and 13, when one contemplates the effect of rotation of the shafts 19 and 20 on the core bars 21 after the latter have been elevated to the extent permitted by the depth of the slots 22 and 23.

When the pallet support and the molded blocks carried on the pallets have been elevated to the extent permitted by the lift of the jacks 52, the support and blocks are lifted by means of a crane, for example, and removed to a suitable point for storage during aging. The blocks having been cured are strong enough to be handled and can safely be removed from the pallets and piled, thus freeing the pallet assembly for further use in the shell for a repetition of the molding cycle. By means of the apparatus described, I am able to complete a molding and curing operation within about two hours.

In a modification of the invention illustrated in Fig. 14, a plurality of shells such as that already described and indicated generally at 62 are disposed side by side within a supporting framework indicated at 63. Each shell is supported on compression springs 64. Longitudinal angles 65 are disposed between the angle bars 16 at the ends of the shell on bolts 66 reciprocable in the framework 63, and passing through the springs 64. The framework 63 includes fixed angles 67 and 68 resting on the upper flange of longitudinal channels 69 supported by columns 70. A cover 71 is removably disposed over each shell and, with the frame-work assembly which includes side walls 71a, constitutes a curing chamber fully enclosing the shell but leaving it open for the application of heat from below by means shortly to be described.

The resilient mounting of the shells permits vibration of the latter individually by vibrating means carried on a hopper car travelling along the channels 69 from one shell to the next.

Fig. 14 also illustrates one method of supplying heat to the space below the shells for circulation through the hollow members thereof as already explained. The framework 63 is disposed on a foundation 72 having a water trough 73 formed therein and provided with steam pipes 74 whereby the water is heated to a temperature above that at which it evolves steam.

It will be apparent from the foregoing description that the invention provides a relatively simple yet highly effective mechanism for producing molded blocks of superior quality expeditiously and at relatively low cost. I contemplate that a block manufacturing plant will comprise a plurality of units such as that disclosed herein arranged side by side and supplied successively with concrete by a hopper car or concrete mixer travelling the length of the entire installation. By this arrangement, only a relatively small crew of workmen will be required to produce a substantial output of blocks daily. The longitudinal bars 14 of adjacent units serve to define a hollow space 75 as shown in Fig. 7 whereby heating steam may be confined adjacent the side walls 12 and 13 of the shell. The superior quality of the blocks made by this mechanism results from their being made by the so-called "wet" process, i. e., by pouring a relatively liquid mix into molds, as contrasted with the usual processes of tamping a relatively dry mix into molds.

Although I have illustrated and described herein but a preferred embodiment of the invention with a modification, it will be understood that changes in the construction and operation described may be made without departing from the spirit of the invention or the scope of the appended claims.

I claim:

1. In an apparatus for making concrete articles, a shell comprising a bottom plate, studs extending upwardly therefrom, core bars secured to said studs and extending across said plate, cores mounted on said bars, a movable mold portion disposed in said shell and means secured to said studs for moving said movable mold portion.

2. Apparatus for making cored concrete articles comprising a gang mold including a relatively fixed shell providing side and end walls for mold compartments, a movable pallet supporting member adapted to be received in said shell and providing a side and bottom wall for each mold compartment, and means on said shell for moving said pallet supporting member.

3. A gang mold comprising relatively fixed and liftable members, the liftable member being adapted to be disposed in the fixed member, said members providing, when so assembled, a plurality of individual molds each having four walls and a bottom, three adjacent walls of each individual mold being secured to and forming part of said fixed member, and the remaining side wall and the bottom of each individual mold being secured to and forming part of said liftable member.

4. Apparatus for making concrete articles comprising a relatively fixed shell and a relatively movable member adapted to be disposed in said shell, said shell including the end and side walls of a mold and sub-dividing walls extending inwardly from said side walls but terminating short of the center of the shell, the space between the inner ends of the sub-dividing walls being closed by the movable member, said movable member having pallets thereon in spaced relation adapted to fit closely between said sub-dividing walls.

5. Molding apparatus comprising a relatively fixed frame, a rectangular shell supported in said frame including vertical side and end walls, sub-dividing walls extending inwardly from said side walls and terminating short of the center of the shell, and a pallet assembly removably disposable in said shell, said assembly including a beam having pallets secured thereto in spaced relation, said assembly fitting closely but removably in said shell, when lowered thereinto, with the pallets abutting the side and end walls thereof and said beam abutting the inner ends of said sub-dividing walls.

6. Molding apparatus as defined by claim 5 characterized by cores mounted on said frame in spaced relation, and holes in said pallets adapted to receive said cores.

7. A gang mold including separable members defining when assembled a plurality of mold compartments, a frame supporting said members, vertically movable cores extending into each compartment, supports for said cores mounted on said frame, and means for effecting movement of the supports successively, to break the bond between said cores and the articles formed in said compartments.

8. Apparatus for making cored concrete articles comprising a gang mold including a plurality of mold compartments and having at least a portion thereof mounted for movement relative to the remainder, vertically movable cores extending into each of said mold compartments, and means mounting said cores effective to arrest them successively after limited movement thereof with the articles and movable portion of the mold.

9. Apparatus for making cored concrete articles as defined by claim 8 characterized by said core-mounting means being operable to exert successively on said cores a force tending to separate them from the molds.

10. Molding apparatus comprising a shell including side and end walls and sub-dividing walls extending inwardly from the side walls but terminating short of the center of the shell, and a pallet assembly removably disposable in said shell, including a beam with pallets secured thereto in spaced relation, said assembly fitting closely in said shell when lowered thereinto, with said pallets abutting said side and end walls and said beam abutting the inner ends of said sub-dividing walls.

11. Molding apparatus as defined by claim 10 characterized by said beam and sub-dividing walls being hollow to admit a heating fluid.

12. Apparatus for making cored concrete articles comprising a gang mold including a plurality of mold compartments and having at least a portion thereof mounted for movement relative to the remainder, vertically movable cores extending into each of said mold compartments, and means mounting said cores, including through bars having slots of varying depths therein, effective to arrest them successively after limited movement thereof with the articles and movable portion of the mold.

13. Apparatus for making cored concrete articles comprising a gang mold including a plurality of mold compartments and having at least a portion thereof mounted for movement relative to the remainder, vertically movable cores extending into each of said mold compartments, and rotatable through shafts mounting said cores, said shafts having cam surfaces thereon effective on rotation of the shafts to cause successive movement of the cores relative to said mold compartments.

ALBERT HENDERSON.